US012681446B2

(12) United States Patent    (10) Patent No.:   US 12,681,446 B2

Meshkinfam et al.    (45) Date of Patent:    Jul. 14, 2026

(54) TORQUE PREDICTION USING MODEL PREDICTIVE CONTROL

(71) Applicant: Pratt & Whitney Canada Corp., Longueuil (CA)

(72) Inventors: Ezzat Meshkinfam, Mississauga (CA); Xuening Lu, Oakville (CA); Thomas Trevor Ricci, Pointe-Claire (CA)

(73) Assignee: Pratt & Whitney Canada Corp., Longueuil (CA)

( * ) Notice: Subject to any disclaimer, the term of this patent is extended or adjusted under 35 U.S.C. 154(b) by 151 days.

(21) Appl. No.: 18/624,985

(22) Filed: Apr. 2, 2024

(65) Prior Publication Data

US 2025/0306547 A1    Oct. 2, 2025

(51) Int. Cl.
*G05B 13/04*      (2006.01)
(52) U.S. Cl.
CPC ................................... G05B 13/048 (2013.01)
(58) Field of Classification Search
CPC ...................................................... G05B 13/048
See application file for complete search history.

(56) References Cited

U.S. PATENT DOCUMENTS

| | | | | |
|---|---|---|---|---|
| 11,279,240 | B2 * | 3/2022 | Moubarak | ............ B60K 17/046 |
| 2005/0193739 | A1 * | 9/2005 | Brunell | ................ G05B 13/042 |
| | | | | 60/772 |
| 2023/0265792 | A1 * | 8/2023 | Wang | ........................ F02C 3/20 |
| | | | | 60/780 |

FOREIGN PATENT DOCUMENTS

| | | | | | |
|---|---|---|---|---|---|
| CN | 112327669 | A | * | 2/2021 | ............ G05B 17/02 |
| CN | 115016255 | A | | 9/2022 | |
| EP | 3640750 | B1 | * | 12/2023 | ............ F01D 17/24 |

* cited by examiner

*Primary Examiner* — Scott A Browne
*Assistant Examiner* — Jason Nguyen

(57) ABSTRACT

A method includes obtaining multiple parameters associated with operation of a turbine engine. The method also includes applying a model predictive control algorithm to the parameters to predict a future torque value of a shaft of the turbine engine, the future torque value indicating a likelihood of future shaft shear. The method further includes, in response to the future torque value being outside of an expected range, performing an action to reduce risk of the future shaft shear.

14 Claims, 3 Drawing Sheets

300

START

302 — OBTAIN MULTIPLE PARAMETERS ASSOCIATED WITH OPERATION OF A TURBINE ENGINE

304 — APPLY A MPC ALGORITHM TO THE PARAMETERS TO PREDICT A FUTURE TORQUE VALUE

306 — DETERMINE WIHETHER THE FUTURE TORQUE VALUE IS OUTSIDE OF AN EXPECTED RANGE

308 — IN RESPONSE TO THE FUTURE TORQUE VALUE BEING OUTSIDE OF THE EXPECTED RANGE, PERFORM AN ACTION TO REDUCE RISK OF FUTURE SHAFT SHEAR

END

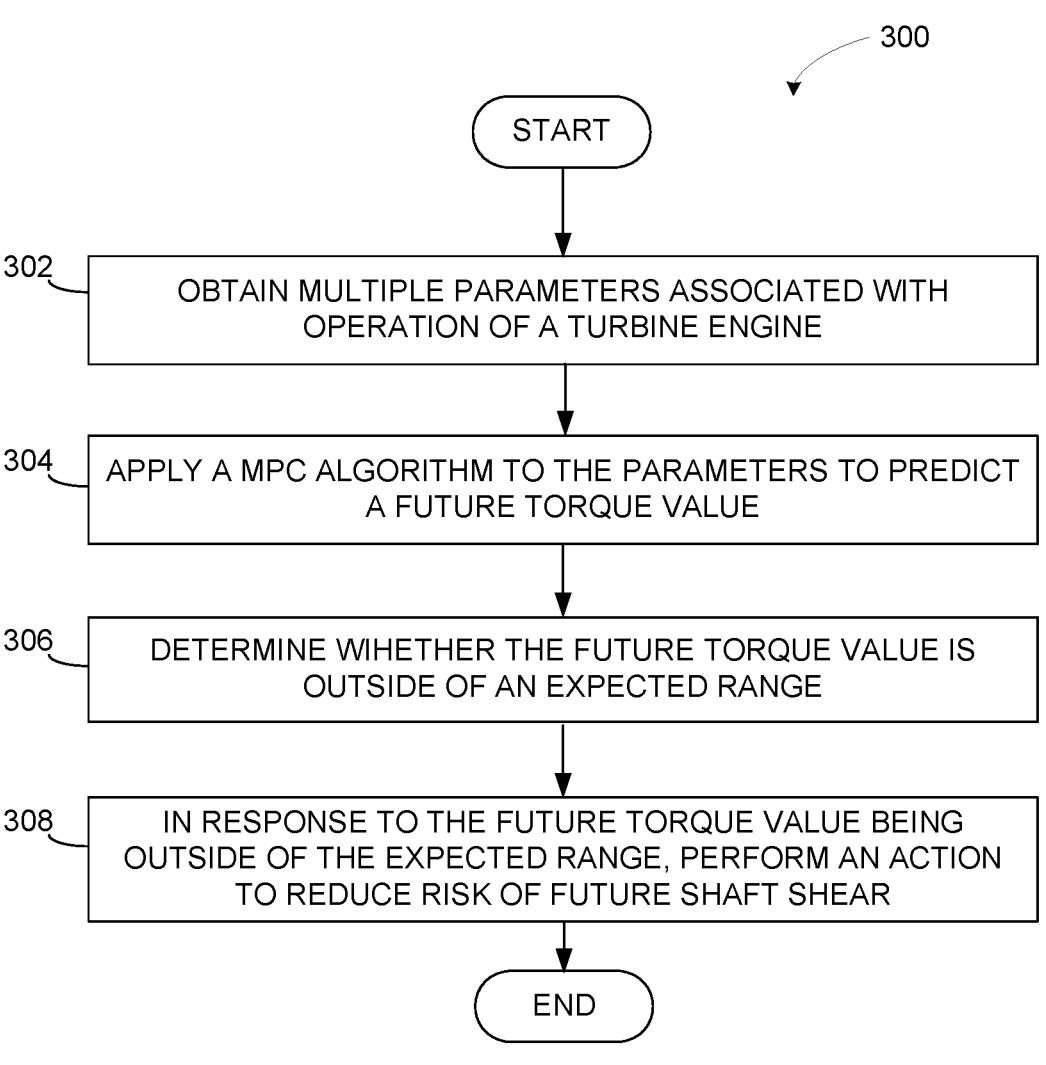

300

START

302　OBTAIN MULTIPLE PARAMETERS ASSOCIATED WITH OPERATION OF A TURBINE ENGINE

304　APPLY A MPC ALGORITHM TO THE PARAMETERS TO PREDICT A FUTURE TORQUE VALUE

306　DETERMINE WIHETHER THE FUTURE TORQUE VALUE IS OUTSIDE OF AN EXPECTED RANGE

308　IN RESPONSE TO THE FUTURE TORQUE VALUE BEING OUTSIDE OF THE EXPECTED RANGE, PERFORM AN ACTION TO REDUCE RISK OF FUTURE SHAFT SHEAR

END

FIG. 3

TORQUE PREDICTION USING MODEL PREDICTIVE CONTROL

TECHNICAL FIELD

This disclosure is generally directed to aviation turbine engines. More specifically, this disclosure is directed to systems and methods for torque prediction using model predictive control.

BACKGROUND

A gas turbine engine includes an engine shaft that connects a turbine rotor to a load, such as a fan, a propeller, or a helicopter rotor. Detecting the presence or likelihood of shear in the engine shaft is an important element that should be implemented as early as possible to prevent damage to the engine or any other hazardous event.

SUMMARY

This disclosure is directed to systems and methods for torque prediction using model predictive control.

In a first embodiment, a method includes obtaining multiple parameters associated with operation of a turbine engine. The method also includes applying a model predictive control algorithm to the parameters to predict a future torque value of a shaft of the turbine engine, the future torque value indicating a likelihood of future shaft shear. The method further includes, in response to the future torque value being outside of an expected range, performing an action to reduce risk of the future shaft shear.

In a second embodiment, a system includes at least one processing device configured to obtain multiple parameters associated with operation of a turbine engine. The at least one processing device is also configured to apply a model predictive control algorithm to the parameters to predict a future torque value of a shaft of the turbine engine, where the future torque value indicates a likelihood of future shaft shear. The at least one processing device is further configured, in response to the future torque value being outside of an expected range, to perform an action to reduce risk of the future shaft shear.

In a third embodiment, a non-transitory machine-readable medium contains instructions that when executed cause at least one processor of an electronic device to obtain multiple parameters associated with operation of a turbine engine. The non-transitory machine-readable medium also contains instructions that when executed cause the at least one processor to apply a model predictive control algorithm to the parameters to predict a future torque value of a shaft of the turbine engine, where the future torque value indicates a likelihood of future shaft shear. The non-transitory machine-readable medium further contains instructions that when executed cause the at least one processor, in response to the future torque value being outside of an expected range, to perform an action to reduce risk of the future shaft shear.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 3 illustrates an example method for torque prediction using model predictive control according to this disclosure.

DETAILED DESCRIPTION

Figure 1:
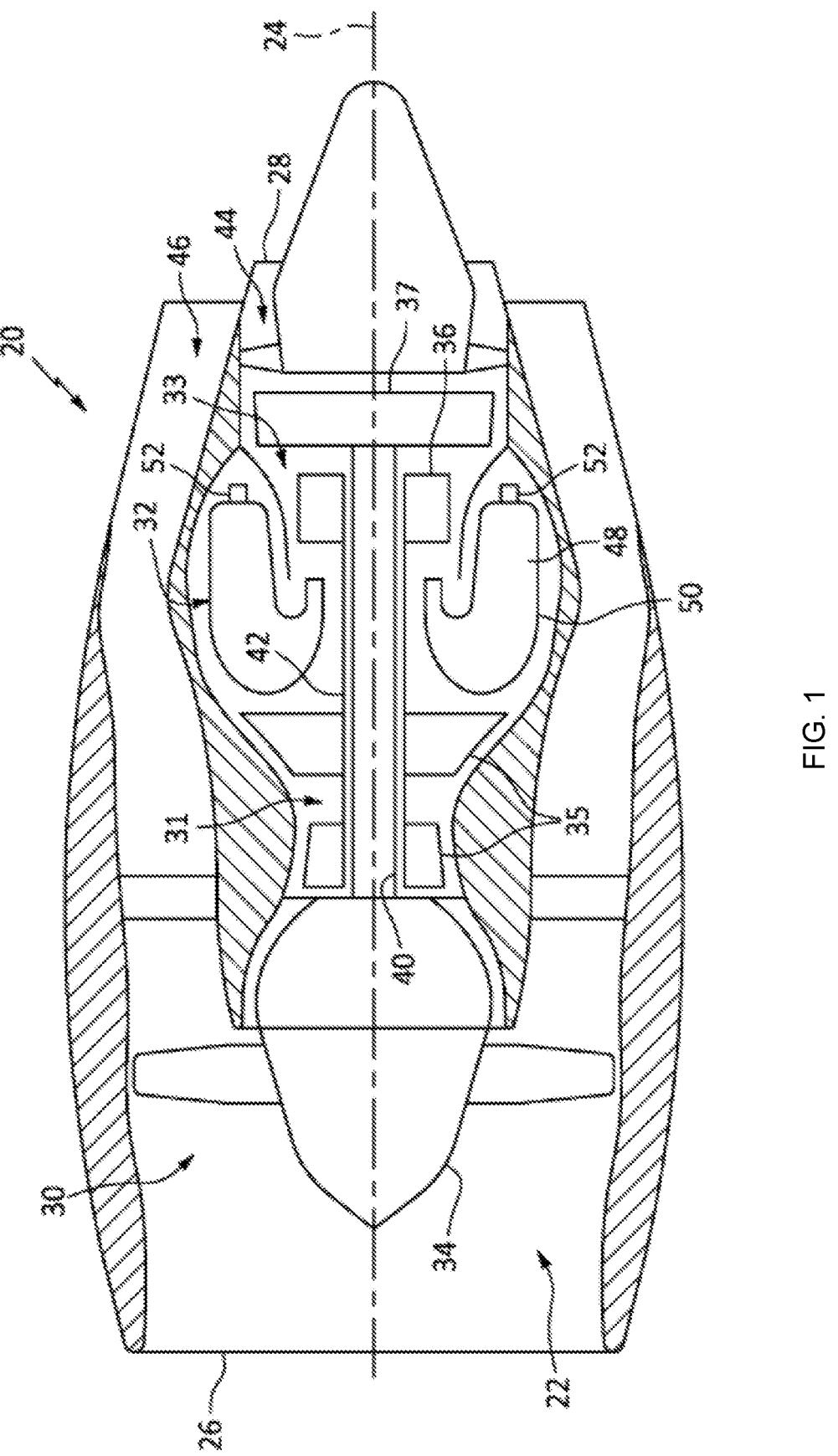
FIG. 1 illustrates an aircraft propulsion system with a turbofan turbine engine according to this disclosure.
Figure 2:
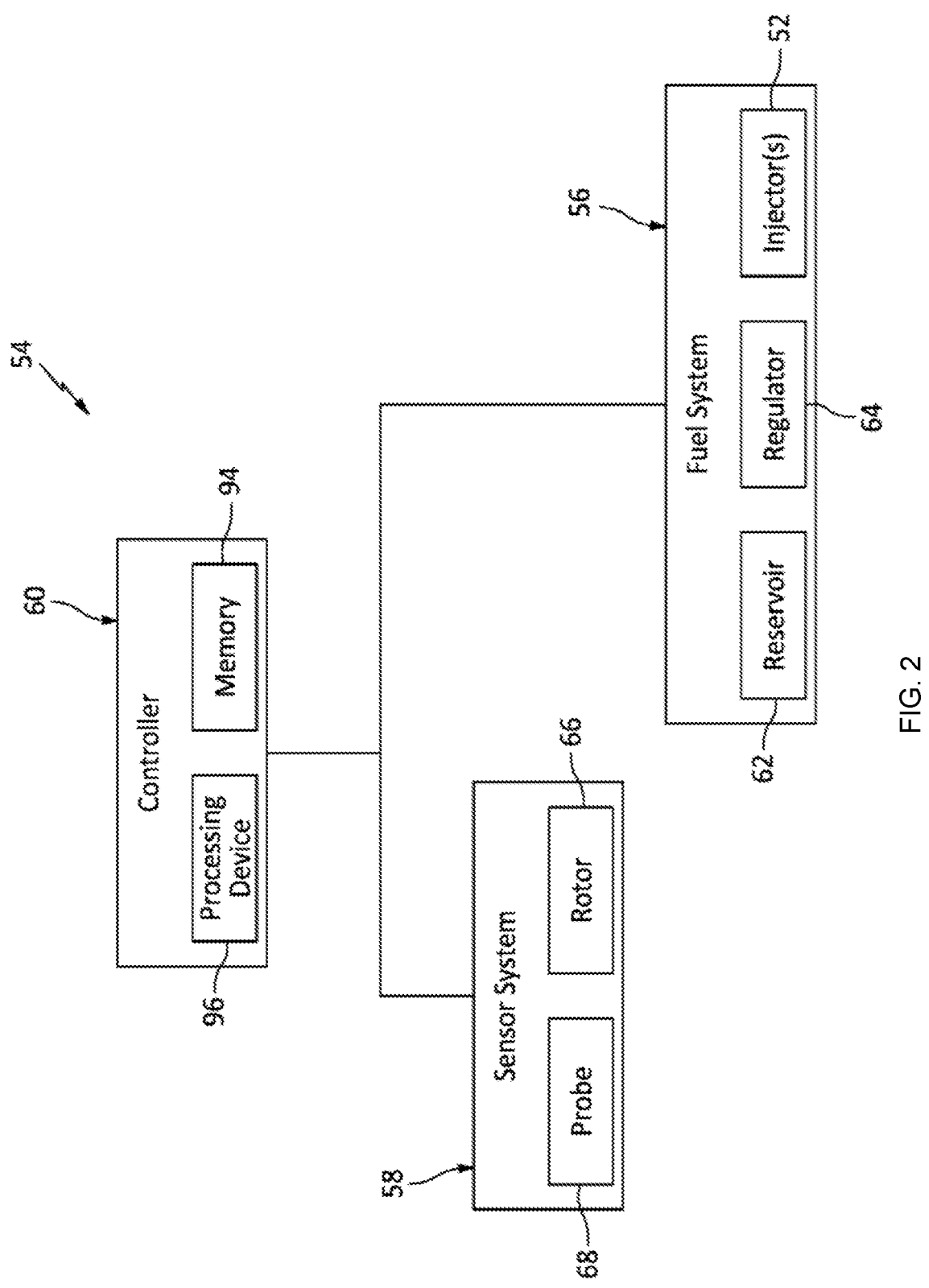
FIG. 2 illustrates a system for use with the turbine engine of FIG. 1 according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, a gas turbine engine includes an engine shaft that connects a turbine rotor to a load, such as a fan, a propeller or a helicopter rotor. A hybrid electric powerplant (HEP) is a parallel hybrid-electric turboprop system that includes a propeller system, a thermal engine, and an electric powertrain. Detecting the presence or likelihood of shear in the engine shaft is an important element that should be implemented as early as possible to prevent damage to the engine or any other hazardous event. If a shaft shear occurs, the system needs to react quickly to prevent a hazardous outcome by shutting off the system quickly.

Multiple techniques for detecting and accommodating shaft shear already exist, including the use of mechanical displacement probes to detect the axial motion of subcomponents following a shaft after shear, and the use of a controller that processes speed inputs and calculates a rate of change. However, these techniques involve post-event indicators (such as axial motion sensing) or time-consuming signal processing (such as rate change of shaft speed), which are not optimal solutions for an event requiring rapid engine shutoff.

This disclosure provides a system and method for torque prediction using model predictive control, which can be implemented for use with an aviation engine. Model predictive control is a constrained optimization that involves formulation of an optimizing problem based on a finite horizon optimal control problem at each sample interval. As described in greater detail below, the disclosed torque prediction system can use explicit model predictive control (cMPC) techniques to predict future torque dynamics, which can be an indicator of shaft shear. The disclosed system can detect the likelihood of shaft shear before the shaft shear actually occurs, thereby increasing the amount of time available to address a shear event.

Note that while this disclosure is described with respect to aviation turbine engines, it will be understood that the principles disclosed here are also applicable to other types of devices or environments. For example, the turbine engine may alternatively be a turbojet turbine engine, a turboprop turbine engine, a turboshaft turbine engine, an auxiliary power unit, an industrial turbine engine for a power plant, or any other type of turbine engine in which identifying shaft shear would be useful.

FIG. 1 illustrates an aircraft propulsion system 20 with a turbofan turbine engine 22 according to this disclosure. As shown in FIG. 1, the turbine engine 22 extends along an axial centerline 24 of the turbine engine 22 between an upstream airflow inlet 26 and a downstream airflow exhaust 28. The turbine engine 22 includes a fan section 30, a compressor section 31, a combustor section 32, and a turbine section 33.

The fan section 30 includes a fan rotor 34. The compressor section 31 includes a compressor rotor 35. The turbine section 33 includes a high pressure turbine (HPT) rotor 36 and a low pressure turbine (LPT) rotor 37, where the LPT rotor 37 is configured as a power turbine rotor. Each of these rotors 34-37 includes a plurality of rotor blades arranged circumferentially around and connected to one or more respective rotor disks.

The fan rotor 34 is connected to the LPT rotor 37 through a low speed shaft 40. The compressor rotor 35 is connected to the HPT rotor 36 through a high speed shaft 42. The low speed shaft 40 and the high speed shaft 42 of FIG. 1 are rotatable about the axial centerline 24, which can be, for example, a rotational axis. The low speed shaft 40 of FIG. 1 extends through a bore of the high speed shaft 42 between the fan rotor 34 and the LPT rotor 37.

During operation, air enters the turbine engine 22 through the airflow inlet 26. This air is directed through the fan section 30 and into a core flowpath 44 and a bypass flowpath 46. The core flowpath 44 extends sequentially through the engine sections 31-33, which can comprise an engine core. The air within the core flowpath 44 may be referred to as "core air." The bypass flowpath 46 extends through a bypass duct, which bypasses the engine core. The air within the bypass flowpath 46 may be referred to as "bypass air."

The core air is compressed by the compressor rotor 35 and directed into an annular combustion chamber 48 of an annular combustor 50 in the combustor section 32. Fuel is injected into the combustion chamber 48 by one or more fuel injectors 52. This fuel is mixed with the compressed core air to provide a fuel-air mixture. The fuel-air mixture is ignited and combustion products thereof flow through and sequentially cause the HPT rotor 36 and the LPT rotor 37 to rotate. The rotation of the HPT rotor 36 drives rotation of the compressor rotor 35 and, thus, compression of air received from an inlet into the core flowpath 44. The rotation of the LPT rotor 37 drives rotation of the fan rotor 34, which propels bypass air through and out of the bypass flowpath 46. The propulsion of the bypass air may account for a significant portion (such as a majority) of thrust generated by the turbine engine 22.

FIG. 2 illustrates a system 54 for the turbine engine 22 according to this disclosure. The turbine engine system 54 includes a fuel system 56, a sensor system 58, and a controller 60.

As shown in FIG. 2, the fuel system 56 includes a fuel reservoir 62, a fuel flow regulator 64, and the one or more fuel injectors 52. The fuel reservoir 62 may be configured as, or otherwise include, a container, such as a tank, a cylinder, a pressure vessel, a bladder, or the like. The fuel reservoir 62 is configured to contain and hold a quantity of fuel. The flow regulator 64 may be configured as, or otherwise include, a pump (such as a main fuel pump) and/or a valve (such as a shutoff valve, a flow control valve, and the like). This flow regulator 64 is configured to regulate a flow of the fuel from the fuel reservoir 62 to the fuel injectors 52. The flow regulator 64, for example, is configured to direct (e.g., pump) the fuel out of the fuel reservoir 62 for delivery to the fuel injectors 52. The fuel system 56, of course, may also include one or more additional components such as, but not limited to, a fuel filter, a heat exchanger (e.g., a heater), and/or an additional flow regulator (such as a boost pump, a bypass valve, a pressure regulating valve, and the like).

The sensor system 58 is configured to measure one or more engine parameters indicative of shaft twist and/or shaft torque. The term "shaft twist" may describe a condition where at least an axial portion or an entirety of a shaft (temporarily and/or resiliently) twists along its axial centerline/rotational axis in response, for example, to a torque input. The term "shaft torque" may describe torque transmitted through at least an axial portion or an entirety of a shaft. The sensor system 58 of FIG. 3 includes a sensor rotor 66 and a sensor probe 68.

The sensor rotor 66 may be configured as a phonic wheel with inter-digited tooth pairs. In some embodiments, the sensor rotor 66 includes a torque rotor and a reference rotor. The torque rotor can be connected to (such as formed integral with, or fastened, welded, bonded and/or otherwise attached to) a shaft of the turbine engine 22, which may be one of the shafts 40 and 42 in FIG. 1. The torque rotor can project radially out from the engine shaft to an outer periphery. In some embodiments, the torque rotor can include one or more torque teeth arranged circumferentially about the axial centerline 24 in a circular array at the torque rotor outer periphery.

The controller 60 is in signal communication with one or more of the fuel system 56 and the sensor system 58. The controller 60, for example, may be hardwired to and/or wirelessly coupled with the flow regulator 64 and the sensor probe 68.

The controller 60 may be configured as an onboard engine controller, such as an electronic engine controller (EEC), an electronic control unit (ECU), a full-authority digital engine controller (FADEC), etc. The controller 60 may be implemented with a combination of hardware and software. The hardware may include memory 94 and at least one processing device 96, which processing device 96 may include one or more single-core and/or multi-core processors. The hardware may also or alternatively include analog and/or digital circuitry other than that described above.

The memory 94 is configured to store software (such as program instructions) for execution by the processing device 96, which software execution may control and/or facilitate performance of one or more operations such as those described in the methods below. The memory 94 may be a non-transitory computer readable medium. For example, the memory 94 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

In some embodiments, the system 54 is configured to perform torque prediction using eMPC techniques to predict future torque dynamics, which can be an indicator of shaft shear. One limitation of using model predictive control is the complex online calculations. To address this, the disclosed eMPC techniques uses a multi-parametric quadratic programming method where states are considered as parameters of these solutions. By using these eMPC techniques, the online calculations complexity can be greatly reduced and be less time consuming.

As discussed below, the controller 60 may be configured to perform the torque prediction using the processing device 96 and the memory 94. For shaft shear prediction, dynamic equations can be defined. Then the controller 60 can use eMPC to determine the next torque value and predict an impending shaft shear or detect the shaft shear quicker than existing methods.

To better explain the eMPC techniques used by the system 54, it may be helpful to provide some general information regarding MPC. The main aspects of the formulation of a linear MPC problem as a multi-parametric quadratic problem, are shown below as Equations (1) and (2):

$$x(k+1) = Ax(k) + Bu(k) \qquad (1)$$

$$y(k) = Cx(k) \qquad (2)$$

where $x(k) \in \mathbb{R}^n$ is a state variable, $u(k) \in \mathbb{R}^m$ is an input variable, and $A \in \mathbb{R}^{n \times n}$ and $B \in \mathbb{R}^{n \times m}$ are controllable pairs.

For the current state x (t), MPC solves an optimization problem using Equations (3) and (4) as shown below:

$$\min_U \left\{ J(U, x(k)) = x_{k+N|k}^T P x_{k+N|k} + \sum_{i=0}^{N-1} x_{k+i|k}^T Q x_{k+i|k} + u_{k+i}^T R u_{k+i} \right\} \qquad (3)$$

such that:

$$y_{min} \le y_{k+1|k} \le y_{max}, k = 1, \dots, N \qquad (4)$$

$$u_{min} \le u_{k+1|k} \le u_{max}, i = 1, \dots, M-1$$

$$u_{k+i} = K x_{k+i|k}, M \le i \le N-1$$

$$x_{k|K} = x(k)$$

$$x_{k+i+1|k} = A x_{k+i|k} + B u_{k+i}, i \ge 0$$

$$y_{k+i|k} = C x_{k+i|k}, i \ge 0$$

where $U \triangleq \{u_k, \dots, u_{k+M-1}\}$, $R = R^T > 0$, $P = P^T > 0$, $Q = Q^T \ge 0$.

Equation (3) solves the constraint linear quadratic regulator problem for Equation (1) with Q and R weight matrices exactly, when the final cost matrix P and the gain K are computed from the assumption that constraints are not active for k≥N.

The description above including Equations (1)-(4) provide a general overview of MPC. Use of MPC enables the controller 60 to predict the next torque value of a shaft of the turbine engine 22 (which may be one of the shafts 40 and 42) and implement any accommodation logic pre-event (depending on the system's behavior) or at least earlier than existing methods. As discussed above, changes in torque value can correlate to a shaft shear event, which can result in damage to the engine shaft or other components of the turbine engine 22.

In addition, use of eMPC techniques results in a simplified solution and a faster response. One important benefit to using eMPC is to have an explicit state feedback solution that avoids the need of repeated real-time optimization. In addition, eMPC enables the controller 60 to anticipate future events and take any control actions accordingly. Hence eMPC is useful for applications with a fast sampling rate, where other control methods are not capable.

For shaft shear detection, the linear dynamic equations of the system can be defined. The following Equations (5)-(9) are assumed to calculate the torque value:

$$Q = Q_{mech} = Q_{hydr} \qquad (5)$$

Here, shaft torque Q can be defined as mechanical torque $Q_{mech}$ or hydromechanical torque $Q_{hydr}$. In the discussion below, mechanical torque is used. In some embodiments, hydromechanical torque can be substituted if known. The mechanical torque $Q_{mech}$ can be calculated as follows:

$$Q_{mech} = \eta_{eff} \frac{\frac{d}{dt}(W_{fqty})}{N_E} \qquad (6)$$

where $\eta_{eff}$ is a volumetric efficiency, $W_{fqty}$ is the quantity of the fuel flow from the fuel reservoir 62 to the fuel injectors 52, and $N_E$ is the engine speed, which is represented by the speed of the shaft 40 or 42.

The mechanical torque $Q_{mech}$ can also be calculated as follows:

$$Q_{mech} = \alpha \frac{\rho_{air}}{\lambda} \qquad (7)$$

where $\alpha$ is an engine characteristic constant (which can be determined empirically), $\rho_{air}$ is the density of the ambient air, and $\lambda$ is a stoichiometric ratio or air-fuel ratio. Equation (7) can be expanded further, as shown by the following:

$$Q_{mech} = \qquad (8)$$

$$\alpha \frac{\rho_{air}}{\lambda} = \alpha(N_E) \frac{\left(\frac{P_{manifold}}{R \times T_{manifold}}\right)}{\lambda} = \beta(W_{fqty}(t), N_E(t)) \frac{P_{manifold}(t)}{\lambda(W_{fqty}(t)N_E(t))}$$

where $\beta$ is another engine characteristic constant (which can be determined empirically), $P_{manifold}$ and $T_{manifold}$ are the pressure and temperature of the fuel manifold, and R is a gas constant.

Equation (8) can be adapted as a function of mechanical torque over time, such as given in the following form:

$$Q_{mech}(t) = \alpha \frac{\rho_{air}}{\lambda} \qquad (9)$$

7

8

-continued $$= \alpha(N_E) \frac{\left(\frac{P_{manifold}}{R \times T_{manifold}}\right)}{\lambda}$$

$$= \beta(t) f_1(W_{fqty}(t), N_E(t)) \frac{P_{manifold}(t)}{\lambda(t) f_2(W_{fqty}(t), N_E(t))}$$

where $f_1$ and $f_2$ are functions of time that can vary for each turbine engine 22 and can be determined empirically.

Based on Equation (9) for mechanical torque, eMPC state equations for mechanical torque can be calculated as shown in Equations (10)-(12). These are obtained by applying Equation (9) to eMPC principles, such as generally represented in Equations (1)-(4).

$$\dot{W}_{fqty} = \frac{N_E(t)Q(t)}{f_3(\lambda(t))} \tag{10}$$

$$\dot{N}_E = \gamma(t) f_4(W_{fqty}(t)) \frac{d\lambda(t)}{dt} \frac{dQ(t)}{dt} \tag{11}$$

$$\dot{\lambda} = \frac{d}{dt}\left(\alpha(N_E) \frac{P_{manifold}(t)}{Q(t) \times R \times T_{manifold}(t)}\right) \tag{12}$$

where $\gamma(t)$ is a time-varying engine characteristic coefficient (which can be determined empirically), and $f_3$ and $f_4$ are functions of time that can vary for each turbine engine 22 and can be determined empirically.

Here, the values $W_{fqty}$, $N_E$, and $\lambda$ are the parameters of the turbine engine 22 that can be used as state variables that are applied to the eMPC cost function. For example, Equation (1) can be re-expressed as shown in Equations (13)-(15) below:

$$Y(t) = A(t)X(t) + B(t)u(t) \tag{13}$$

$$A(t) = \begin{bmatrix} A_1(t) \\ A_2(t) \\ A_3(t) \end{bmatrix} \tag{14}$$

$$X(t) = \begin{bmatrix} W_{fqty}(t) \\ N_E(t) \\ \lambda(t) \end{bmatrix} \tag{15}$$

In Equations (13)-(15), X(t) is a vector $[x_1, x_2, x_3]$, where $x_1 = W_{fqty}$, $x_2 = N_E$, and $x_3 = \lambda$. A(t) is a vector of coefficients that can vary over time, B(t) is a scalar coefficient that can vary over time, and u(t) represents the torque Q of the shaft 40 or 42 over time.

Equations (13)-(15) can be applied to the eMPC cost function, which can be expressed as follows:

$$J = \int_0^{0.002} \left[x_1^2(t) + x_2^2(t) + x_3^2(t) + Ru^2(t)\right] dt \tag{16}$$

In Equation (16), the value 0.002 represents a shaft parameter sampling rate Ts=0.002 sec. Of course, other sampling rates are possible and within the scope of this disclosure. The benefit of using the cost function in Equation (16) is not only for fast convergence but also to satisfy the stability criteria.

Next, the continuous time system is converted to a discrete time system. For the above equations, the following discrete system is given:

$$x(k+1) = A_d x(k) + B_d u(k) \tag{17}$$

It can be seen that Equation (17) is very similar to Equation (1) above. Here, x(k) represents the parameters of the turbine engine 22 corresponding to the torque at a current time k, and x(k+1) represents the predicted future parameter values corresponding to the torque at time k+1. With an initial condition $x(k)=[0\ 0\ 0]^T$, the sampling time (Ts), and the eMPC equations (Equations (3) and (4)) over the control horizon and prediction horizon, the cost matrices can be solved.

Once the system 54 has obtained the predicted future torque value, the system 54 can determine whether the future torque value is outside of an expected range. For example, if the predicted future torque value is different than an expected torque value by a predetermined threshold difference amount, or if a rate of change of the torque value over time is different than an expected rate of change, then this can indicate a likelihood that shear may soon occur. If the predicted next torque value indicates that a shaft shear is possible or likely, then the system 54 can perform any of various actions to reduce risk of the future shaft shear. For example, the system 54 can automatically shut down the turbine engine 22. The system 54 can also slow the engine speed. Additionally or alternatively, the system 54 can send a notification of the expected condition to another system or to a human operator, such as the pilot. This would allow the other system or the pilot to review the notification and take whatever action is needed, such as manually shutting down the turbine engine 22.

Although FIGS. 1 and 2 illustrate examples of an aircraft propulsion system, a turbine engine system, and related details, various changes may be made to FIGS. 1 and 2. For example, while the figures show only one turbine engine 22, actual implementations can include more than one turbine engine 22. Also, the processing device 96 can include multiple processors or processing devices. In addition, various components shown and described above may be combined, further subdivided, replicated, rearranged, or omitted and additional components may be added according to particular needs. In general, aircraft propulsion systems come in a wide variety of configurations, and FIGS. 1 and 2 do not limit this disclosure to any particular configuration.

FIG. 3 illustrates an example method 300 for torque prediction using model predictive control according to this disclosure. For case of explanation, the method 300 is described as being performed using the system 54 of FIG. 2. However, the method 300 could be used with any other suitable device or system.

As shown in FIG. 3, multiple parameters associated with operation of a turbine engine are obtained at step 302. This may include, for example, the controller 60 obtaining the shaft speed, the fuel flow quantity, and the air-fuel ratio of the turbine engine 22. A model predictive control algorithm is applied to the parameters at step 304, in order to predict a future torque value of a shaft of the turbine engine, where the future torque value indicates a likelihood of future shaft shear. This may include, for example, the controller 60 applying an eMPC algorithm to the parameters to predict a future torque value of the shaft 40 or 42. It is determined at step 306 whether the future torque value is outside of an expected range. This may include, for example, the controller 60 determining whether the future torque value is outside of an expected range. In response to the future torque value being outside of the expected range, an action is performed at step 308 in order to reduce risk of the future shaft shear. This may include, for example, the controller 60 stopping the turbine engine, slowing a speed of the turbine engine, or transmitting a notification for review by a human operator.

Although FIG. 3 illustrates one example of a method 300 for torque prediction using model predictive control, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising: obtaining multiple parameters associated with operation of a turbine engine; applying a model predictive control algorithm to the parameters to predict a future torque value of a shaft of the turbine engine, the future torque value indicating a likelihood of future shaft shear, wherein applying the model predictive control algorithm to the parameters comprises processing multiple state equations associated with a torque of the shaft of the turbine engine using the parameters comprising a shaft speed, a fuel flow quantity, an air-fuel ratio, a mechanical torque of the shaft, functions of time that vary for the turbine engine, a time-varying engine characteristic coefficient, an engine characteristic constant, a pressure of a fuel manifold, a temperature of the fuel manifold, and a gas constant; wherein the state equations comprise:

$$\dot{W}_{fqty} = \frac{N_E(t)Q(t)}{f_3(\lambda(t))}$$

$$\dot{N}_E = \gamma(t)f_4(W_{fqty}(t))\frac{d\lambda(t)}{dt}\frac{dQ(t)}{dt}$$

$$\dot{\lambda} = \frac{d}{dt}\left(\alpha(N_E)\frac{P_{manifold}(t)}{Q(t) \times R \times T_{manifold}(t)}\right)$$

where $W_{fqty}$ is the fuel flow quantity, $N_E$ is the shaft speed, $\lambda$ is the air-fuel ratio, Q is the mechanical torque of the shaft, $f_3$ and $f_4$ are the functions of time that vary for the turbine engine, $\gamma(t)$ is the time-varying engine characteristic coefficient, $\alpha$ is the engine characteristic constant, $P_{manifold}$ and $T_{manifold}$ are the pressure and the temperature of the fuel manifold, and R is the gas constant; and in response to the future torque value being outside of an expected range, controlling the turbine engine based on the predicted future torque to perform an action to reduce risk of the future shaft shear.

2. The method of claim 1, wherein performing the action comprises at least one of:

stopping the turbine engine;
slowing a speed of the turbine engine; and
transmitting a notification for review by a human operator.

3. The method of claim 1, further comprising:

determining whether the future torque value is outside of the expected range.

4. The method of claim 1, wherein the model predictive control algorithm is an explicit model predictive control (eMPC) algorithm.

5. The method of claim 1, wherein the turbine engine is part of an aviation vehicle.

6. A system comprising: at least one processing device configured to: obtain multiple parameters associated with operation of a turbine engine; apply a model predictive control algorithm to the parameters to predict a future torque value of a shaft of the turbine engine, the future torque value indicating a likelihood of future shaft shear, wherein, to apply the model predictive control algorithm to the parameters, the at least one processing device is configured to process multiple state equations associated with a torque of the shaft of the turbine engine using the parameters comprising a shaft speed, a fuel flow quantity, an air-fuel ratio, a mechanical torque of the shaft, functions of time that vary for the turbine engine, a time-varying engine characteristic coefficient, an engine characteristic constant, a pressure of a fuel manifold, a temperature of the fuel manifold, and a gas constant; wherein the state equations comprise:

$$W_{fqty} = \frac{N_E(t)Q(t)}{f_3(\lambda(t))}$$

$$\dot{N}_E = \gamma(t)f_4(W_{fqty}(t))\frac{d\lambda(t)}{dt}\frac{dQ(t)}{dt}$$

$$\dot{\lambda} = \frac{d}{dt}\left(\alpha(N_E)\frac{P_{manifold}(t)}{Q(t) \times R \times T_{manifold}(t)}\right)$$

where $W_{fqty}$ is the fuel flow quantity, $N_E$ is the shaft speed, $\lambda$ is the air-fuel ratio, Q is the mechanical torque of the shaft, $f_3$ and $f_4$ are the functions of time that vary for the turbine engine, $\gamma(t)$ is the time-varying engine characteristic coefficient, $\alpha$ is the engine characteristic constant, $P_{manifold}$ and $T_{manifold}$ are the pressure and the temperature of the fuel manifold, and R is the gas constant; and in response to the future torque value being outside of an expected range, control the turbine engine based on the predicted future torque to perform an action to reduce risk of the future shaft shear.

7. The system of claim 6, wherein to perform the action, the at least one processing device is configured to perform at least one of:

stop the turbine engine;

slow a speed of the turbine engine; and transmit a notification for review by a human operator.

8. The system of claim 6, wherein the at least one processing device is further configured to determine whether the future torque value is outside of the expected range.

9. The system of claim 6, wherein the model predictive control algorithm is an explicit model predictive control (eMPC) algorithm.

10. The system of claim 6, wherein the turbine engine is part of an aviation vehicle.

11. A non-transitory machine-readable medium containing instructions that when executed cause at least one processor of an electronic device to: obtain multiple parameters associated with operation of a turbine engine; apply a model predictive control algorithm to the parameters to predict a future torque value of a shaft of the turbine engine, the future torque value indicating a likelihood of future shaft shear, wherein the instructions that when executed cause the at least one processor to apply the model predictive control algorithm to the parameters comprise instructions that when executed cause the at least one processor to process multiple state equations associated with a torque of the shaft of the turbine engine using the parameters comprising a shaft speed, a fuel flow quantity, an air-fuel ratio, a mechanical torque of the shaft, functions of time that vary for the turbine engine, a time-varying engine characteristic coefficient, an engine characteristic constant, a pressure of a fuel manifold, a temperature of the fuel manifold, and a gas constant; wherein the state equations comprise:

$$W_{fqty}^* = \frac{N_E(t)Q(t)}{f_a(\lambda(t))}$$

$$\dot{N}_E^* = \gamma(t)f_4(W_{fqty}(t))\frac{d\lambda(t)}{dt}\frac{dQ(t)}{dt}$$

$$\dot{\lambda}^* = \frac{d}{dt}\left(\alpha(N_E)\frac{P_{manifold}(t)}{Q(t) \times R \times T_{manifold}(t)}\right)$$

where $W_{fqty}$ is the fuel flow quantity, $N_E$ is the shaft speed, $\lambda$ is the air-fuel ratio, Q is the mechanical torque of the shaft, $f_3$ and $f_4$ are the functions of time that vary for the turbine engine, $\gamma(t)$ is the time-varying engine characteristic coefficient, $\alpha$ is the engine characteristic constant, $P_{manifold}$ and $T_{manifold}$ are the pressure and the temperature of the fuel manifold, and R is the gas constant; and in response to the future torque value being outside of an expected range, control the turbine engine based on the predicted future torque to perform an action to reduce risk of the future shaft shear.

12. The non-transitory machine-readable medium of claim 11, wherein the instructions that when executed cause the at least one processor to perform the action comprise:

instructions that when executed cause the at least one processor to perform at least one of:

stop the turbine engine;

slow a speed of the turbine engine; and transmit a notification for review by a human operator.

13. The non-transitory machine-readable medium of claim 11, further containing instructions that when executed cause the at least one processor to determine whether the future torque value is outside of the expected range.

14. The non-transitory machine-readable medium of claim 11, wherein the model predictive control algorithm is an explicit model predictive control (eMPC) algorithm.

* * * * *